(12) United States Patent
Yu et al.

(10) Patent No.: US 11,628,861 B2
(45) Date of Patent: Apr. 18, 2023

(54) METHOD AND APPARATUS FOR CONTROLLING VEHICLE, DEVICE AND STORAGE MEDIUM

(71) Applicant: BEIJING BAIDU NETCOM SCIENCE AND TECHNOLOGY CO., LTD., Beijing (CN)

(72) Inventors: Ning Yu, Beijing (CN); Fan Zhu, Beijing (CN); Yongyi Sun, Beijing (CN)

(73) Assignee: APOLLO INTELLIGENT DRIVING TECHNOLOGY (BEIJING) CO., LTD., Beijing (CN)

(*) Notice: Subject to any disclaimer, the term of this patent is extended or adjusted under 35 U.S.C. 154(b) by 79 days.

(21) Appl. No.: 16/918,976

(22) Filed: Jul. 1, 2020

(65) Prior Publication Data

US 2021/0094571 A1 Apr. 1, 2021

(30) Foreign Application Priority Data

Sep. 30, 2019 (CN) .......................... 201910940629.7

(51) Int. Cl.
*B60W 60/00* (2020.01)
*G01C 21/34* (2006.01)
*G01C 21/36* (2006.01)

(52) U.S. Cl.
CPC .... *B60W 60/0015* (2020.02); *B60W 60/0051* (2020.02); *B60W 60/0053* (2020.02);
(Continued)

(58) Field of Classification Search
CPC ......... B60W 60/0015; B60W 60/0051; B60W 60/0053; B60W 2556/10; B60W 2556/50;
(Continued)

(56) References Cited

U.S. PATENT DOCUMENTS 9,511,767 B1* 12/2016 Okumura ............. G08G 1/0104
2012/0083960 A1* 4/2012 Zhu .................... G06Q 30/0207
701/23
(Continued)

FOREIGN PATENT DOCUMENTS

CN 105122327 A 12/2015
CN 110214296 A 9/2019
(Continued)

OTHER PUBLICATIONS

Japanese Patent Application No. 2020-110079, Office Action dated Apr. 27, 2021, 3 pages.
(Continued)

*Primary Examiner* — Rachid Bendidi
*Assistant Examiner* — Abdalla A Khaled
(74) *Attorney, Agent, or Firm* — Cozen O'Connor (57) ABSTRACT

Embodiments of the present disclosure provide a method and an apparatus for controlling a vehicle, a device and a storage medium. The method includes: in response to determining that a target vehicle is located in a historical takeover area, obtaining historical control information associated with passing through a historical path in the historical takeover area, the historical takeover area indicating an area through which a vehicle in a manual control state passed in a previous period; determining a planned path for the target vehicle to pass through the historical takeover area based on the historical control information; and controlling the target vehicle to pass through the historical takeover area in an automatic control state based on the planned path.

16 Claims, 5 Drawing Sheets

(52) U.S. Cl.
CPC ..... *G01C 21/3407* (2013.01); *G01C 21/3453* (2013.01); *G01C 21/3691* (2013.01)

(58) Field of Classification Search
CPC ............ B60W 60/0011; B60W 50/00; B60W 2050/0005; G01C 21/3407; G01C 21/3453; G01C 21/3691
See application file for complete search history.

(56) References Cited

U.S. PATENT DOCUMENTS

| | | | | |
|---|---|---|---|---|
| 2015/0142207 | A1* | 5/2015 | Flehmig | B60W 30/18163 701/1 |
| 2015/0166069 | A1* | 6/2015 | Engelman | B60W 30/16 701/23 |
| 2017/0008522 | A1* | 1/2017 | Sato | G05D 1/0212 |
| 2017/0116854 | A1* | 4/2017 | Sugawara | G08G 1/0129 |
| 2017/0158191 | A1* | 6/2017 | Bills | B60W 10/06 |
| 2017/0329331 | A1* | 11/2017 | Gao | B60W 50/14 |
| 2018/0081362 | A1* | 3/2018 | Linke | G08G 1/0129 |
| 2018/0314258 | A1* | 11/2018 | Brew | B60W 30/10 |
| 2018/0362049 | A1* | 12/2018 | Avireddi | B60W 50/0097 |
| 2019/0034794 | A1* | 1/2019 | Ogale | G06N 3/008 |
| 2019/0072974 | A1* | 3/2019 | Hwang | G06V 20/582 |
| 2019/0086916 | A1* | 3/2019 | Choi | G05D 1/0061 |
| 2019/0129422 | A1* | 5/2019 | Nojoumian | G05D 1/0088 |
| 2019/0187706 | A1* | 6/2019 | Zhou | G06N 5/04 |
| 2019/0204841 | A1 | 7/2019 | Luo | |
| 2019/0266516 | A1* | 8/2019 | Olabiyi | G08G 1/0112 |
| 2020/0012280 | A1* | 1/2020 | Lin | G01C 21/3848 |
| 2020/0097754 | A1* | 3/2020 | Tawari | G06V 20/56 |

FOREIGN PATENT DOCUMENTS

| | | |
|---|---|---|
| DE | 102013015348 A1 | 4/2014 |
| EP | 3451104 A1 | 3/2019 |
| EP | 3462269 A1 | 4/2019 |
| JP | 2002074339 A | 3/2002 |
| JP | 2006026344 A | 2/2006 |
| JP | 2018022353 A | 2/2018 |

OTHER PUBLICATIONS

Japanese Patent Application No. 2020-110079, English translation of Office Action dated Apr. 27, 2021, 3 pages.
European Patent Application No. 20165880.4, extended Search and Opinion dated Feb. 22, 2021, 7 pages.
Chinese Patent Application No. 201910940629.7, Office Action dated Oct. 8, 2021, 11 pages.
Chinese Patent Application No. 201910940629.7, English translation of Office Action dated Oct. 8, 2021, 10 pages.
Japanese Patent Application No. 2020-110079, Office Action dated Nov. 15, 2022, 3 pages.
Japanese Patent Application No. 2020-110079, English translation of Office Action dated Nov. 15, 2022, 4 pages.

* cited by examiner

METHOD AND APPARATUS FOR CONTROLLING VEHICLE, DEVICE AND STORAGE MEDIUM

CROSS-REFERENCE TO RELATED APPLICATIONS

This application is based on and claims priority to Chinese Patent Application No. 201910940629.7, filed with the State Intellectual Property Office of P. R. China on Sep. 30, 2019, the entire contents of which are incorporated herein by reference.

TECHNICAL FIELD

Embodiments of the present disclosure relate to the field of computer technologies, and more particularly, to a method for controlling a vehicle, an apparatus for controlling a vehicle, a device, and a computer-readable storage medium.

BACKGROUND

With the development of technology, smart driving and autonomous driving technologies have received more and more attention, and people are also increasingly concerned about the safety of self-driving vehicles. In some areas of a road, due to safety restrictions such as distance constraints from obstacles or road boundaries, self-driving vehicles may have difficulty passing the areas autonomously, the driver or the safety officer needs to manually control the vehicle to pass the area, which limits the application of the self-driving vehicle.

SUMMARY

Embodiments of the present disclosure provide a method for controlling a vehicle. The method includes: in response to determining that a target vehicle is located in a historical takeover area, obtaining historical control information associated with passing through a historical path in the historical takeover area, the historical takeover area indicating an area through which a vehicle in a manual control state passed in a previous period; determining a planned path for the target vehicle to pass through the historical takeover area based on the historical control information; and controlling the target vehicle to pass through the historical takeover area in an automatic control state based on the planned path.

Embodiments of the present disclosure provide a device. The device includes one or more processors, and a storage device configured to store one or more programs. When the one or more programs are executed by the one or more processors, the electronic device is configured to implement the method according to embodiments of the present disclosure.

Embodiments of the present disclosure provide a computer-readable storage medium having a computer program stored thereon, when the computer program is executed by a processor, the processor is configured to implement the method according to embodiments of the present disclosure.

It should be understood that the contents described in the summary are neither intended to limit key or important features of the embodiments of the present disclosure, nor to limit the scope of the present disclosure. Other features of the present disclosure will become readily understood from the following description.

BRIEF DESCRIPTION OF THE DRAWINGS

The above and other features, advantages and aspects of the embodiments of the present disclosure will become more apparent with reference to the accompanying drawings and the following detailed description. In the drawings, the same or similar reference numerals indicate the same or similar elements, in which.

DETAILED DESCRIPTION

Embodiments of the present disclosure will be described in more detail below with reference to the accompanying drawings. While certain embodiments of the present disclosure have been illustrated in the accompanying drawings, it is to be understood that the present disclosure may be embodied in various forms and should not be construed as being limited to the embodiments set forth herein. Instead, these embodiments are provided for a thorough and complete understanding of the present disclosure. It should be understood that the drawings and embodiments of the present disclosure are for illustrative purposes only and are not intended to limit the scope of the present disclosure.

In the description of the embodiments of the present disclosure, the term "including" and its equivalents should be construed as open-ended inclusions, i.e., "include, but is not limited to". The term "according to" is to be understood as "at least partially according to". The term "an embodiment" or "the embodiment" should be understood as "at least one embodiment". Terms "first", "second" and the like may refer to different or identical objects. Other explicit and implicit definitions may also be included below.

In recent years, driverless or self-driving technology has gradually emerged. Due to safety restrictions of autonomous vehicles (i.e., the self-driving vehicles), some autonomous vehicles may not be able to autonomously pass some driving areas such as narrower curves or roads blocked by obstacles. Generally, the driver or the safety officer is required to manually control the vehicle to pass through these areas, which is unacceptable for achieving fully autonomous driving.

According to embodiments of the present disclosure, a solution for controlling a vehicle is provided. With the solution, in response to determining that the target vehicle is located in the historical takeover area, historical control information associated with passing through a historical path in the historical takeover area is obtained. The historical takeover area indicates the area through which the vehicle in a manual control state passed in a previous period. The planned path for the target vehicle to pass through the historical takeover area is determined based on the historical control information, and the target vehicle is controlled to pass through the historical takeover area under an automatic control state based on the planned path. With the solution of the present disclosure, the self-driving vehicle can intelligently learn historical control information determined when the driver manually controls the vehicle to pass through the historical takeover area, such that the self-driving vehicle can pass through the historical takeover area, thereby improving the traffic rate for the vehicle to autonomously pass through the historical takeover area.

Embodiments of the present disclosure will be described below with reference to the accompanying drawings.

Figure 1:
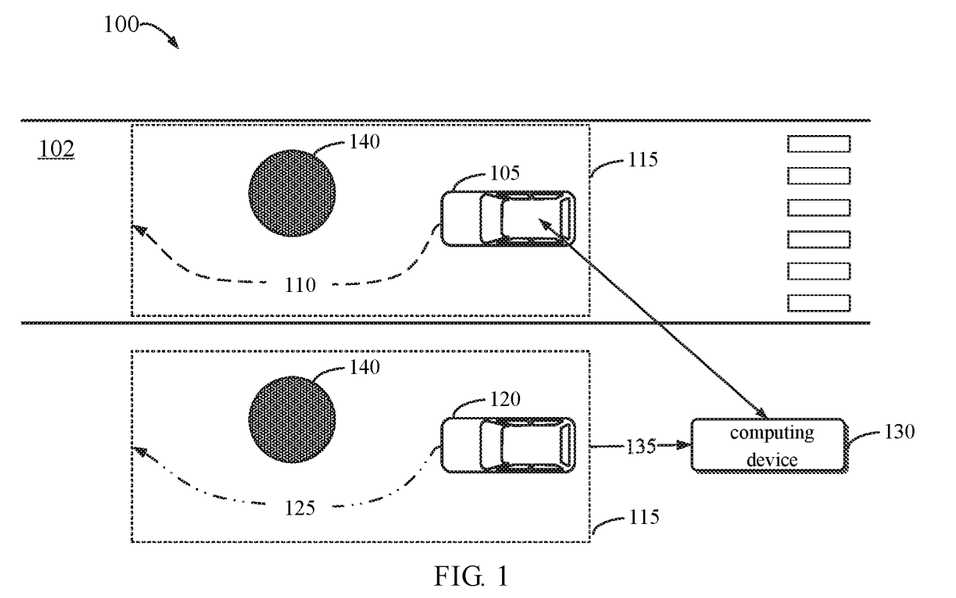
FIG. 1 is a schematic diagram illustrating an exemplary environment in which various embodiments of the present disclosure is implemented.

FIG. 1 illustrates a schematic diagram of an exemplary environment 100 in which various embodiments of the present disclosure are implemented. Some objects, including a target vehicle 105 traveling on a road 102, are shown schematically in the exemplary environment 100. In FIG. 1, the target vehicle 105 may be any type of vehicle that may carry people and/or objects and move through a power system such as an engine, including but not limited to a car, a truck, a bus, an electric vehicle, a motorcycle, a motorhome, a train, or the like. The one or more target vehicles 105 in the environment 100 may be vehicles having a certain degree of autonomous driving capability, also referred to as autonomous vehicles.

The target vehicle 105 may be communicatively coupled to a computing device 130. Although shown as a separate entity, the computing device 130 may be embedded in the target vehicle 105. The computing device 130 may also be an entity external to the target vehicle 105, and may communicate with the target vehicle 105 via a wireless network. The computing device 130 may be implemented as one or more computing devices, which include at least a processor, a memory, and other components typically found in a general-purpose computer in order to implement functions such as computing, storage, communication, and control.

As shown in FIG. 1, in a previous period, the driver or the safety person once controlled a vehicle 120 to pass through a historical takeover area 115, i.e., the vehicle 120 may pass through the historical takeover area 115 under manual control, and the passing path may be the historical path 125 that bypasses an obstacle 140. In some embodiments, the vehicle 120 may be the same vehicle as the target vehicle 105. Alternatively, the vehicle 120 may be different from the target vehicle 105. For example, the vehicle 120 may be the same type of vehicle for testing as the target vehicle 105. When it is determined that the target vehicle 105 travels into the historical takeover area 115, the computing device 130 may obtain historical control information 135 associated with the historical path 125, and determine, based on the historical control information, the planned path 110 configured to control the target vehicle 105 to pass through the historical takeover area 115. It should be understood that, the arrangement of the vehicle and the historical takeover area shown in FIG. 1 are only schematic, and the solution of the present disclosure is not intended to limit the arrangement in any way. The process of controlling the target vehicle 105 to pass through the historical takeover area 115 will be described in detail below with reference to FIG. 2 and FIGS. 3A-3C.

Figure 2:
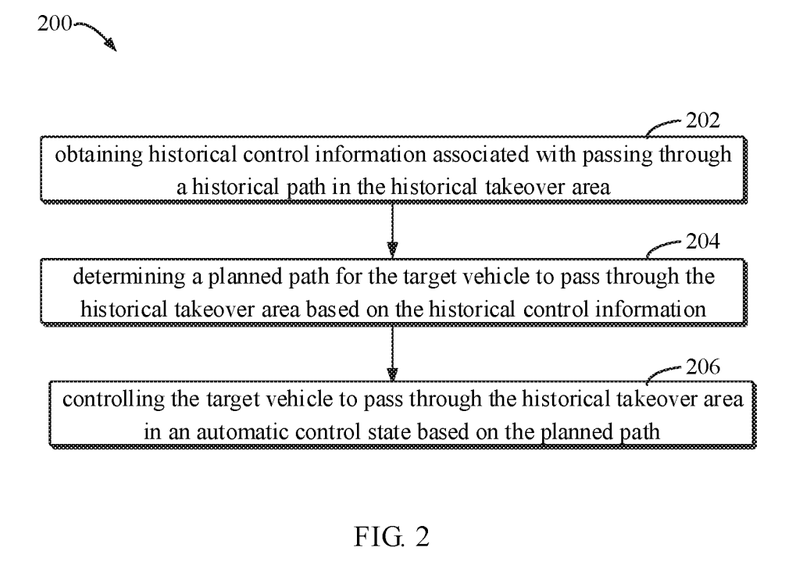
FIG. 2 is a flowchart illustrating a method for controlling a vehicle according to some embodiments of the present disclosure.

FIG. 2 is a flowchart illustrating a method 200 for controlling a vehicle according to some embodiments of the present disclosure. The method 200 may be performed, for example, by the computing device 130 shown in FIG. 1. As shown in FIG. 2, the method may include the following acts.

At block 202, in response to determining that the target vehicle 105 is located in the historical takeover area 115, the computing device 130 obtains historical control information 135 associated with passing through the historical path 125 in the historical takeover area 115. The historical takeover area 115 indicates an area through which the vehicle in a manual control state passed in a previous period. In some embodiments, the computing device 130 may obtain the current location of the target vehicle 105, and compare the current location with the historical takeover area 115 to determine whether the target vehicle 105 is located in the historical takeover area 115.

In some embodiments, the historical control information 135 may include at least one of: decision-making information corresponding to the historical path 125, trajectory information of the historical path 125, or traffic constraint information corresponding to the historical path 125. In an example, the decision-making information corresponding to the historical path may indicate the strategy that the driver used to pass through the historical takeover area 115. Taking FIG. 1 as an example, the decision-making information may indicate that the driver controls the vehicle 120 to bypass the obstacle 140 from the left. It should be understood that, bypassing the obstacle is merely an exemplary scenario for illustrating the present solution, and the solution of the present disclosure may be applicable to any other applicable scenarios. The present disclosure is not intended to limit the scenarios in any way.

The trajectory information of the historical path 125 may indicate, for example, a set of locations passed by the vehicle 120 when the driver controls the vehicle 120 to pass through the historical takeover area 115. The traffic constraint information may indicate, for example, one or more constraints satisfied by the driver when controlling the vehicle 120 to pass through the historical takeover area 115, such as a minimum distance (for example, 30 cm) from an obstacle, a minimum distance (for example, 20 cm) from a road boundary, or the like.

In some embodiments, for example, the historical control information 135 associated with the vehicle 120 passing through the history path 125 of an area may be recorded by a computing device coupled to the vehicle 120. In an example, the historical control information 135 may also be recorded by other devices such as a drive test device. In some embodiments, the historical control information 135 may be, for example, uploaded to a server in the cloud, and the computing device 130 receives the historical control information 135 from the server.

In some embodiments, the vehicle 120 may be the same vehicle as the target vehicle 105. That is, in the previous period, the driver manually took over the target vehicle 105, and manually controlled the vehicle 105 to pass through the historical takeover area 115. When the target vehicle 105 travels to the historical takeover area 115 again, the computing device 130 may obtain the historical control information 135 associated with the historical path 125.

In some embodiments, the historical takeover area 115 may include at least one path. For example, the historical takeover area 115 may include different paths that the driver controls different vehicles traveling. In this case, the computing device 130 may determine, from the historical takeover area 115, the historical path 125 through which the target vehicle 105 passes in the manual control state, and obtain the historical control information associated with the historical path 125.

In some embodiments, the vehicle 120 may be a vehicle different from the target vehicle 105. That is, in the previous period, the driver manually took over another vehicle 120 different from the target vehicle 105, and manually controlled the vehicle 120 to pass through the historical takeover area 115. When the target vehicle 105 travels to the historical takeover area 115, the computing device 130 may obtain the historical control information 135 associated with the historical path 125 of the vehicle 120.

In some embodiments, the computing device 130 may determine, from the historical takeover area, the historical path 125 through which a reference vehicle corresponding to the target vehicle 105 passes the historical takeover area 115 in the manual control state, and obtain the historical control information 135 associated with the historical path 125. In some embodiments, the reference vehicle may be, for example, a vehicle of the same model as the target vehicle 105, and is different from the target vehicle 150, such that manual control of the reference vehicle by the driver may be instructive for the target vehicle 105. In some other embodiments, the reference vehicle may also be, for example, a vehicle that is close in size to the target vehicle 105. For example, the computing device 130 may determine the reference vehicle by comparing size information of the vehicle.

At block 204, the computing device 130 determines a planned path 110 for the target vehicle 105 to pass through the historical takeover area 115 based on the historical control information 135.

Figure 3A:
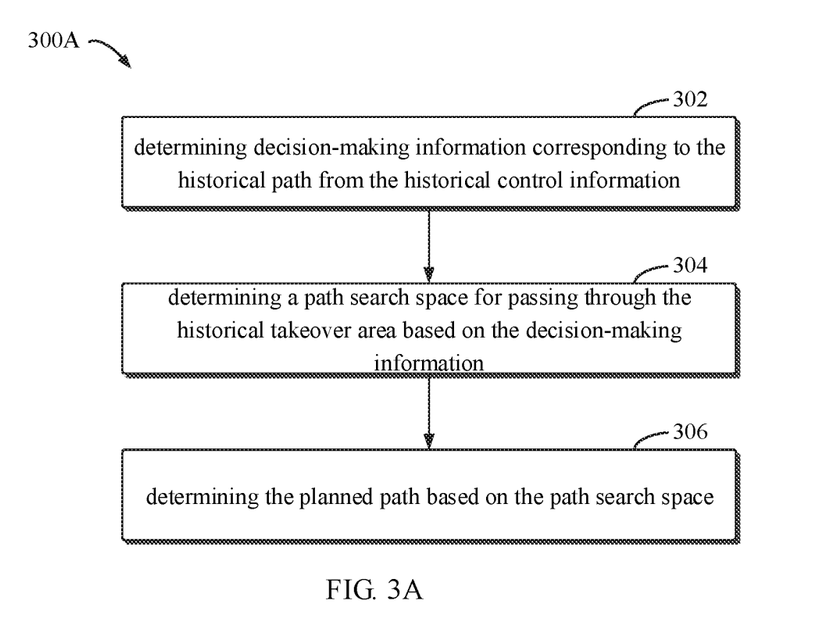
FIG. 3A is a flowchart illustrating a process for determining a planned path according to some embodiments of the present disclosure.
Figure 3B:
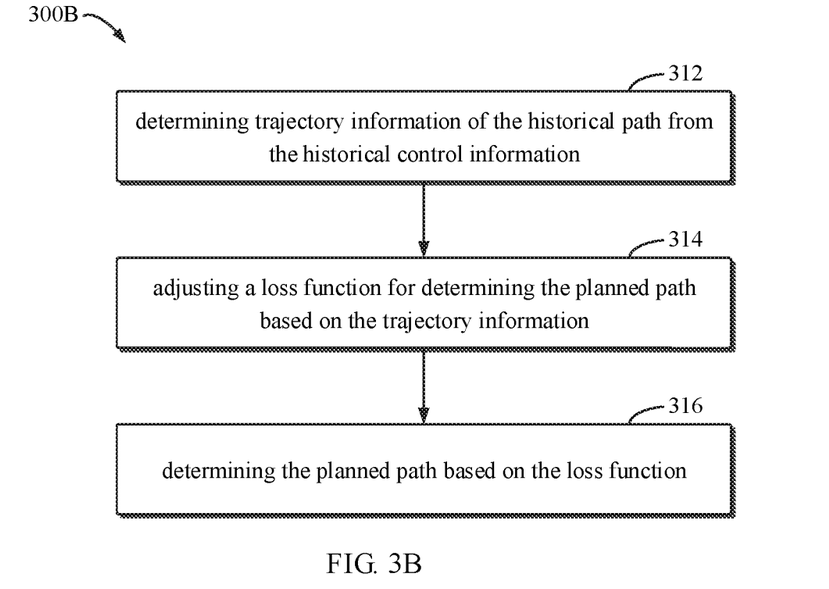
FIG. 3B is a flowchart illustrating a process for determining a planned path according to some other embodiments of the present disclosure.
Figure 3C:
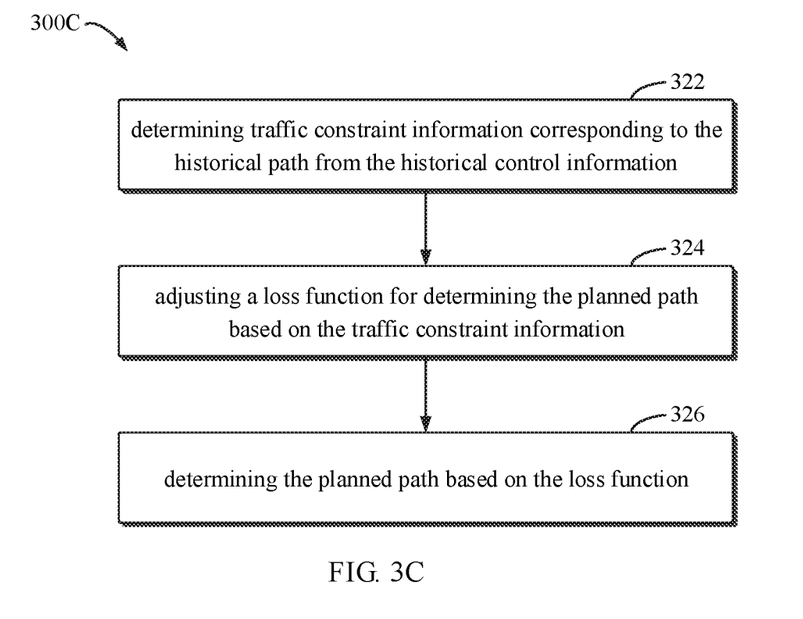
FIG. 3C is a flowchart illustrating a process for determining a planned path according to some other embodiments of the present disclosure.

The process of block 204 will be described below with reference to FIGS. 3A to 3C, FIGS. 3A to 3C illustrate the processes of determining the planned path 110 according to embodiments of the present disclosure.

In some embodiments, the computing device 130 may determine the planned path 110 based on the decision-making information in the historical control information 135. In an example, as shown in FIG. 3A, at block 302, the computing device 130 may determine the decision-making information corresponding to the historical path 125 from the historical control information 135. For example, as described above, the computing device 130 may determine, for example, that the decision-making information corresponding to the historical path 125 is bypassing the obstacle 140 from the left.

At block 304, the computing device 130 may determine a path search space for passing through the historical takeover area 115 based on the decision-making information.

In an example, with reference to FIG. 1, after entering the historical takeover area 115, the computing device 130 may determine the path for passing through the historical takeover area 115 based on the decision of bypassing the obstacle 140 from the left, such that the fault or dangerous decisions such as controlling the target vehicle 150 bypassing the obstacle 140 from the right can be avoided.

At block 306, the computing device 130 may determine the planned path based on the path search space.

For example, as shown FIG. 1, after the path search space corresponding to the decision of bypassing the obstacle 140 from the left is determined, the computing device 130 may employ any suitable path planning technique to determine the planned path 110 from the path search space.

In some embodiments, the computing device 130 may determine the planned path 110 based on the trajectory information in the historical control information 135. In an example, as shown in FIG. 3B, at block 312, the computing device 130 may determine the trajectory information of the historical path 125 from the historical control information 135. For example, as described above, the trajectory information may be, for example, a set of locations that the vehicle 120 passed through when the vehicle 120 is controlled to pass through the historical takeover area 115 by the driver.

At block 314, the computing device 130 may adjust a loss function for determining the planned path 110 based on the trajectory information.

In autonomous driving, the loss function is generally configured to determine the optimal passing path in the path search space. The loss function may consider one or more factors, including the offset from a reference line, the distance from an obstacle, the distance from a road boundary, and the like. The reference line may be, for example, the centerline of a lane. Based on the loss function, the passing path determined may be close to the centerline of the lane while being as far away as possible from the obstacle and the road boundary.

In some embodiments, the computing device 130 may introduce the offset from the historical path 125 in the loss function based on the trajectory information. Based on the loss function, the computing device 130 may enable the planned path to fit the historical path 125 passed by the vehicle when the vehicle is manually driven by the driver, while satisfying other constraints, such that the target vehicle 105 can safely pass through the historical takeover area 115.

At block 316, the computing device 130 may determine the planned path 110 based on the adjusted loss function.

In an example, the difference between the planned path 110 and the historical path 125 is less than a predetermined threshold. With the adjusted loss function, the computing device 130 may make the difference between the planned path 110 and the historical path 125 as small as possible. In some embodiments, the difference may be represented by, for example, the distances between multiple position points in the planned path 110 and corresponding path points in the historical path 125.

In some embodiments, the computing device 130 may determine the planned path 110 based on the traffic constraint information in the historical control information 135. In an example, as shown in FIG. 3C, at block 322, the computing device 130 may determine the traffic constraint information of the historical path 125 from the historical control information 135. For example, as described above, the traffic constraint information may be, for example, one or more constraints satisfied by the driver when controlling the vehicle 120 to pass through the historical takeover area 115, such as a minimum distance (for example, 30 cm) from an obstacle, a minimum distance (for example, 20 cm) from a road boundary, or the like.

At block 324, the computing device 130 may adjust the loss function for determining the planned path 110 based on the traffic constraint information.

As discussed above, the loss function may generally consider one or more factors, including the offset from the reference line, the distance from the obstacle, the distance from the road boundary, and the like. for example, the reference line may indicate the centerline of the lane. Based on such loss function, the passing path determined may be close to the centerline of the lane while being as far away as possible from the obstacle and the road boundary.

Generally, the developer may also set corresponding parameter search spaces for the parameters in the loss function. For example, to ensure safety, the developer may set the distance from the obstacle to not less than 50 cm, and the distance from the road boundary to not less than 40 cm. However, the developer may have no road experience, they may fail to consider the safety needs of the vehicle on some road sections. The great threshold may make the passable area too narrow, the target vehicle 105 cannot obtain the planned path for passing through some road sections, and the small threshold may make the target vehicle 105 dangerous when passing through some road sections.

In some embodiments, the computing device 130 may adjust the search spaces of parameters in the loss function based on the traffic constraint information. For example, when the minimum distance from the obstacle corresponding to the historical path 125 is 30 cm, the computing device 130 may modify the search space corresponding to the distance from the obstacle in the loss function from the previous greater than or equal to 50 cm to greater than or equal to 30 cm, such that the passable area of the target vehicle 105 may be enlarged, thereby increasing the passing rate of the target vehicle 105 passing through the area.

In some embodiments, the computing device 130 may gradually widen the search space by a preset step size. Taking the distance from the obstacle as an example, the computing device 130 may perform the path search according to the initial constraint (such as greater than or equal to 50 cm). In a case that the path cannot be found, the computing device may adjust the constraint to, for example, greater than or equal to 48 cm, and perform the path search again based on the adjusted constraint. The computing device 130 may iteratively adjust the parameter constraint until, for example, to greater than or equal to 30 cm as indicated by the traffic constraint information. When the computing device 130 is still unable to search the passable path under this constraint, the computing device 130 may issue an instruction requesting the driver to manually take over the vehicle.

At block 226, the computing device 130 determines the planned path 110 based on the loss function adjusted, the planned path 110 satisfies the constraint indicated by the traffic constraint information.

Based on the adjusted loss function, in the case where the passing path cannot be searched previously, the computing device 130 may determine the planned path 110 for passing through the historical takeover area 115 due to the expansion of the search space of the passable area.

With reference to FIG. 2, at block 206, the computing device 130 enables the target vehicle 105 to pass through the historical takeover area 115 under an automatic control state based on the planned path 110. In an example, the computing device 130 may send an instruction to the target vehicle 105 to travel along the planned path 110, to cause the target vehicle 105 to pass through the historical takeover area 115.

With the method according to embodiments of the present disclosure, the control information that the driver manually control the vehicle to pass through an area is learned, and by adjusting the traffic strategy or the passable space, the possibility for the vehicle to pass through the area automatically can be improved on the premise of ensuring the safety of the vehicle.

Figure 4:
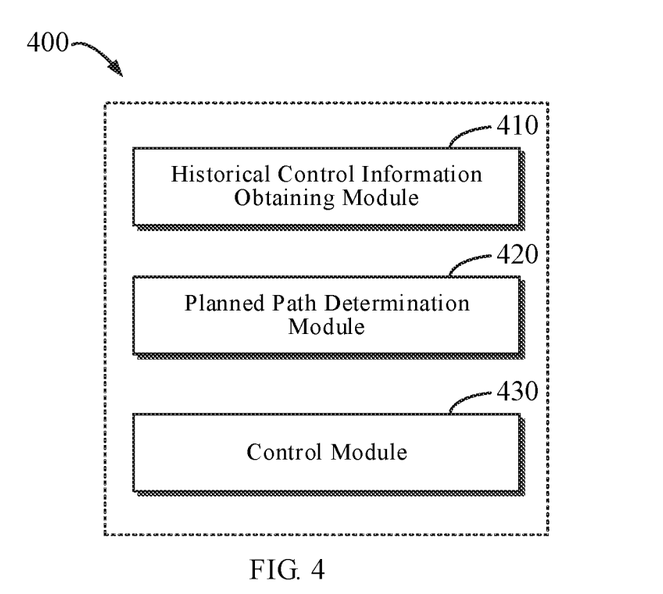
FIG. 4 is a block diagram of an apparatus for controlling a vehicle according to some embodiments of the present disclosure.

FIG. 4 is a block diagram of an apparatus 400 for controlling a vehicle according to some embodiments of the present disclosure. The apparatus 400 may be included in or implemented as the computing device 130 in FIG. 1. As shown in FIG. 4, the apparatus 400 may include a historical control information obtaining module 410, a planned path determination module 420, and a control module 430. The historical control information obtaining module 410 is configured to, in response to determining that the target vehicle is located in the historical takeover area, obtain the historical control information associated with passing through the historical path in the historical takeover area. The historical takeover area indicates an area through which the vehicle in the manual control state passed in the previous period. The planned path determination module 420 is configured to determine the planned path for the target vehicle to pass through the historical takeover area based on the historical control information. The control module 430 is configured to control the target vehicle to pass through the historical takeover area in an automatic control state based on the planned path.

In some embodiments, the historical control information obtaining module 410 includes a first path determination module and a first obtaining module. The first path determination module is configured to determine, from the historical takeover area, the historical path through which the target vehicle passes the historical takeover area in the manual control state. The first obtaining module is configured to obtain the historical control information associated with the historical path.

In some embodiments, the historical control information obtaining module 410 includes a second path determination module, and a second obtaining module. The second path determination module is configured to determine, from the historical takeover area, the historical path through which the reference vehicle corresponding to the target vehicle passes the historical takeover area in the manual control state. The second obtaining module is configured to obtain the historical control information associated with the historical path.

In some embodiments, the historical control information includes at least one of: the decision-making information corresponding to the historical path, the trajectory information of the historical path, and the traffic constraint information corresponding to the historical path.

In some embodiments, the planned path determination module 420 includes a decision-making information determination module, a path search space determination module, and a first path determination module. The decision-making information determination module is configured to determine the decision-making information corresponding to the historical path from the historical control information. The path search space determination module is configured to determine the path search space for passing through the historical takeover area based on the decision-making information. The first path determination module is configured to determine the planned path based on the path search space.

In some embodiments, the planned path determination module 420 includes a trajectory information determination module, a first adjustment module, and a second path determination module. The trajectory information determination module is configured to determine the trajectory information of the historical path from the historical control information. The first adjustment module is configured to adjust the loss function for determining the planned path based on the trajectory information. The second path determination module is configured to determine the planned path based on the loss function adjusted. The difference between the planned path and the historical path is less than the predetermined threshold.

In some embodiments, the planned path determination module 420 includes a traffic constraint information determination module, a second adjustment module, and a third path determination module. The traffic constraint information determination module is configured to determine the traffic constraint information corresponding to the historical path from the historical control information. The second adjustment module is configured to adjust the loss function for determining the planned path based on the traffic constraint information. The third path determination module is configured to determine the planned path based on the loss function adjusted, the planned path satisfying a constraint indicated by the traffic constraint information.

Figure 5:
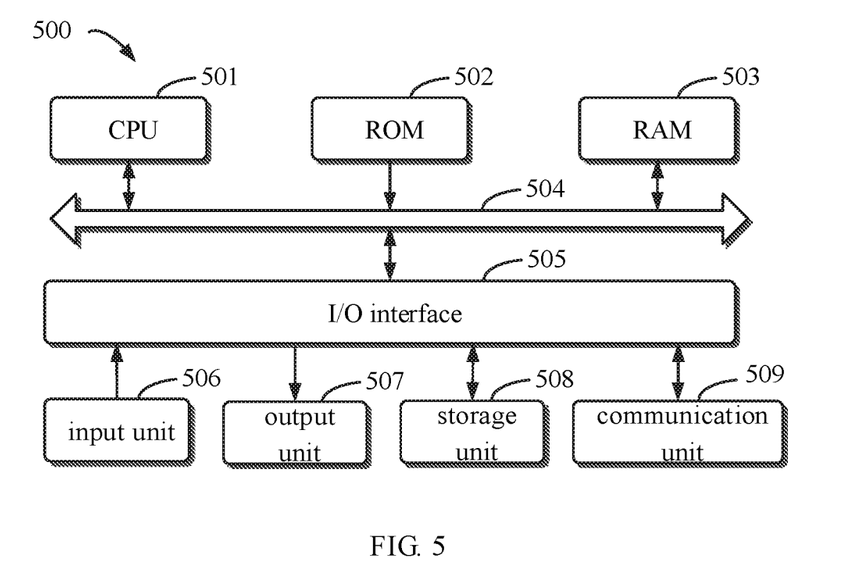
FIG. 5 illustrates a block diagram of a computer device capable of implementing various embodiments of the present disclosure.

FIG. 5 is a schematic block diagram of an exemplary device 500 capable of implementing various embodiments of the present disclosure. The device 500 may be configured to implement the computing device 130 as described in FIG. 1. As illustrated in the figure, the device 500 includes a central processing unit (CPU) 501, which may perform various suitable actions and processes in accordance with computer program instructions stored in a read only memory (ROM) 502 or loaded from a storage unit 508 into a random-access memory (RAM) 503. In the RAM 503, various programs and data necessary for operations of the device 500 may also be stored. The CPU 501, the ROM 502, and the RAM 503 are connected to each other through a bus 504. An input/output (I/O) interface 505 is also connected to the bus 504.

A number of components in the device 500 are connected to the I/O interface 505, including: an input unit 506 such as a keyboard, a mouse, and the like; an output unit 507 such as various types of displays, speakers, etc.; the storage unit 508 such as a magnetic disk, an optical disk, or the like; and a communication unit 509 such as a network card, a modem, a wireless communication transceiver, and so on. The communication unit 509 allows the device 500 to exchange information/data with other devices via a computer network such as the Internet and/or various telecommunications networks.

The processing unit 501 performs the various methods and processes described above, such as the process 300. For example, in some embodiments, the method 200 may be implemented as a computer software program tangibly embodied on a machine-readable medium, such as the storage unit 508. In some embodiments, some or all of the computer programs may be loaded and/or installed onto the device 500 via the ROM 502 and/or the communication unit 509. When a computer program is loaded onto the RAM 503 and executed by the CPU 501, one or more steps in the method 200 described above may be performed. Alternatively, in other embodiments, the CPU 501 may be configured to perform the method 300 in any other suitable manner (e.g., by way of the firmware).

The functions described herein above may be performed, at least in part, by one or more hardware logic components. For example, and without limitation, exemplary types of the hardware logic components that may be used include: a field programmable gate array (FPGA), an application specific integrated circuit (ASIC), an application specific standard product (ASSP), a system on chip (SOC), a complex programmable logic device (CPLD), and the like.

Program codes for performing the method in the present disclosure may be written in any combination of one or more programming languages. These program codes may be provided to a processor or controller in a general-purpose computer, a special purpose computer, or other programmable data processing devices, such that the program codes, when executed by the processor or controller, are configured to implement functions/operations specified in the flow chart and/or block diagrams. The program code may be executed entirely on a machine, partly on the machine, as a separate software package, partly on the machine, partly on a remote computer, or entirely on the remote computer or server.

In the context of the present disclosure, the machine-readable medium may be a tangible medium that may contain, or store a program for use by or in combination with an instruction execution system, an apparatus, or a device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of the machine-readable storage medium may include: an electrical connection having one or more wires, a portable computer disk, a hard disk, a random access memory (RAM), a read only memory (ROM), an Erasable Programmable Read Only Memory (EPROM or a flash memory), an optical fiber, a compact disc read-only memory (CD-ROM), an optical memory component, a magnetic memory component, or any suitable combination thereof.

Moreover, while operations are described in a particular order, this should be understood as that the operations are required to be performed in a particular illustrated order or in a sequential order, or that all illustrated operations are required to be performed to achieve desirable results. In certain circumstances, multitasking and parallel processing may be advantageous. Likewise, while several specific implementation details are included in the above discussion, these should not be construed as limiting the scope of the present disclosure. Certain features described in the context of separate embodiments may also be implemented in combination in a single implementation. Conversely, features that are described in the context of the single implementation may also be implemented in a plurality of implementations separately or in any suitable sub-combination.

Although the subject matter has been described in a language specific to structural features and/or methodological acts, it is to be understood that the subject matter defined in the attached claims is not necessarily limited to the specific features or acts described above. Instead, the specific features and acts described above are merely exemplary forms for implementing the attached claims.

What is claimed is:

1. A method for controlling a vehicle, comprising:
in response to determining that a target vehicle is located in a historical takeover area, obtaining historical control information associated with passing through a historical path in the historical takeover area, the historical takeover area indicating an area through which a vehicle with the same type as the target vehicle in a manual control state passed in a previous period;
determining a planned path for the target vehicle to pass through the historical takeover area based on the historical control information, in which the historical control information includes decision-making information corresponding to the historical path, and trajectory information of the historical path; and
controlling the target vehicle to pass through the historical takeover area in an automatic control state based on the planned path;
wherein determining the planned path for the target vehicle to pass through the historical takeover area based on the historical control information comprises:
determining a path search space for passing through the historical takeover area based on the decision-making information corresponding to the historical path;

introducing an offset from the historical path in a loss function based on the trajectory information of the historical path; and determining the planned path in the path search space based on the loss function, wherein a difference between the planned path and the historical path is less than a predetermined threshold.

2. The method of claim 1, wherein obtaining the historical control information associated with passing through the historical path in the historical takeover area comprises:

determining, from the historical takeover area, a first historical path through which the target vehicle passes the historical takeover area in the manual control state; and obtaining the historical control information associated with the first historical path.

3. The method of claim 1, wherein obtaining the historical control information associated with passing through the historical path in the historical takeover area comprises:

determining, from the historical takeover area, a second historical path through which a reference vehicle corresponding to the target vehicle passes the historical takeover area in the manual control state; and obtaining the historical control information associated with the second historical path.

4. The method of claim 1, wherein the historical control information further comprises traffic constraint information corresponding to the historical path.

5. The method of claim 1, wherein determining the planned path for the target vehicle to pass through the historical takeover area based on the historical control information further comprises:

determining traffic constraint information corresponding to the historical path from the historical control information, wherein the traffic constraint information includes a minimum distance from an obstacle, and a minimum distance from a road boundary;

adjusting the loss function based on the traffic constraint information; and determining the planned path based on the loss function adjusted, the planned path satisfying a constraint indicated by the traffic constraint information.

6. The method of claim 5, wherein adjusting the loss function based on the traffic constraint information comprises:

setting parameter search spaces for parameters in the loss function; and adjusting search spaces of parameters in the loss function based on the traffic constraint information.

7. The method of claim 6, wherein adjusting search spaces of parameters in the loss function comprises:

in response to failing to search a passable path, gradually widening the search spaces of parameters by a preset step size.

8. An apparatus for controlling a vehicle, comprising:
one or more processors; and
a storage device, configured to store one or more programs,
wherein when the one or more programs are executed by the one or more processors, the one or more processors are configured to:
in response to determining that a target vehicle is located in a historical takeover area, obtain historical control information associated with passing through a historical path in the historical takeover area, the historical takeover area indicating an area through which a vehicle with the same type as the target vehicle in a manual control state passed in a previous period;

determine a planned path for the target vehicle to pass through the historical takeover area based on the historical control information, in which the historical control information includes decision-making information corresponding to the historical path, and trajectory information of the historical path; and control the target vehicle to pass through the historical takeover area in an automatic control state based on the planned path;

wherein the one or more processors are further configured to:

determine a path search space for passing through the historical takeover area based on the decision-making information corresponding to the historical path;

introducing an offset from the historical path in a loss function based on the trajectory information of the historical path; and determine the planned path in the path search space based on the loss function adjusted, wherein a difference between the planned path and the historical path is less than a predetermined threshold.

9. The apparatus of claim 8, wherein the one or more processors are further configured to:

determine, from the historical takeover area, a first historical path through which the target vehicle passes the historical takeover area in the manual control state; and obtain the historical control information associated with the first historical path.

10. The apparatus of claim 8, wherein the one or more processors are further configured to: determine, from the historical takeover area, a second historical path through which a reference vehicle corresponding to the target vehicle passes the historical takeover area in the manual control state; and obtain the historical control information associated with the second historical path.

11. The apparatus of claim 8, wherein the historical control information further comprises:

traffic constraint information corresponding to the historical path.

12. The apparatus of claim 8, wherein the one or more processors are further configured to:

determine traffic constraint information corresponding to the historical path from the historical control information, wherein the traffic constraint information includes a minimum distance from an obstacle, and a minimum distance from a road boundary;

adjust the loss function based on the traffic constraint information; and determine the planned path based on the loss function adjusted, the planned path satisfying a constraint indicated by the traffic constraint information.

13. A non-transitory computer-readable storage medium having a stored thereon computer program that, when executed by a processor, causes the processor to implement a method for controlling a vehicle, the method comprising:

in response to determining that a target vehicle is located in a historical takeover area, obtaining historical control information associated with passing through a historical path in the historical takeover area, the historical takeover area indicating an area through which a vehicle with the same type as the target vehicle in a manual control state passed in a previous period;

determining a planned path for the target vehicle to pass through the historical takeover area based on the historical control information, in which the historical control information includes decision-making information corresponding to the historical path, and trajectory information of the historical path; and controlling the target vehicle to pass through the historical takeover area in an automatic control state based on the planned path;

wherein determining the planned path for the target vehicle to pass through the historical takeover area based on the historical control information comprises:

determining a path search space for passing through the historical takeover area based on the decision-making information corresponding to the historical path;

introducing an offset from the historical path in a loss function based on the trajectory information of the historical path; and determining the planned path in the path search space based on the loss function, wherein a difference between the planned path and the historical path is less than a predetermined threshold.

14. The non-transitory computer-readable storage medium of claim 13, wherein obtaining the historical control information associated with passing through the historical path in the historical takeover area comprises:

determining, from the historical takeover area, a first historical path through which the target vehicle passes the historical takeover area in the manual control state; and obtaining the historical control information associated with the first historical path.

15. The non-transitory computer-readable storage medium of claim 13, wherein obtaining the historical control information associated with passing through the historical path in the historical takeover area comprises:

determining, from the historical takeover area, a second historical path through which a reference vehicle corresponding to the target vehicle passes the historical takeover area in the manual control state; and obtaining the historical control information associated with the second historical path.

16. The non-transitory computer-readable storage medium of claim 13, wherein the historical control information further comprises traffic constraint information corresponding to the historical path.

* * * * *